United States Patent
Hintz et al.

(10) Patent No.: US 6,907,304 B1
(45) Date of Patent: Jun. 14, 2005

(54) METHOD AND APPARATUS OF MEASURING A RELATIVE UTILITY FOR EACH OF SEVERAL DIFFERENT TASKS BASED ON IDENTIFIED SYSTEM GOALS

(75) Inventors: Kenneth J. Hintz, Fairfax Station, VA (US); Gregory Alan McIntyre, Alexandria, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/545,517

(22) Filed: Apr. 7, 2000

Related U.S. Application Data

(60) Provisional application No. 60/128,403, filed on Apr. 8, 1999, and provisional application No. 60/128,472, filed on Apr. 9, 1999.

(51) Int. Cl.[7] ............................ G06F 19/00; G06F 17/60
(52) U.S. Cl. ............................................. 700/99; 705/8
(58) Field of Search ........................... 700/97, 99–105, 700/108, 109; 705/7–11; 703/2

(56) References Cited

U.S. PATENT DOCUMENTS

| | | | | |
|---|---|---|---|---|
| 5,440,675 A | * | 8/1995 | Matsunaga et al. | 345/440 |
| 5,758,026 A | * | 5/1998 | Lobley et al. | 706/11 |
| 5,794,224 A | * | 8/1998 | Yufik | 706/14 |
| 6,327,551 B1 | * | 12/2001 | Peterson et al. | 703/1 |

* cited by examiner

Primary Examiner—Leo Picard
Assistant Examiner—Ryan Jarrett
(74) Attorney, Agent, or Firm—David G. Grossman; David Yee; Richard M. Lebovitz

(57) ABSTRACT

The present invention relates to methods and apparatus for measuring a relative utility for each of a plurality of goals which comprise a system objective. More particularly, the present invention relates to methods, systems, and apparatus for quantifying the relative contribution of specific goals to a set of broader goals, and for enabling decision making, and resource allocation, with regard to the performance of those goals based on the quantified relative contribution. In preferred embodiments, a lattice is created based on an ordering relation and relative values are apportioned to the goals using their position in the lattice as including, included, and/or unrelated goals.

16 Claims, 4 Drawing Sheets

Uniformly apportioned values

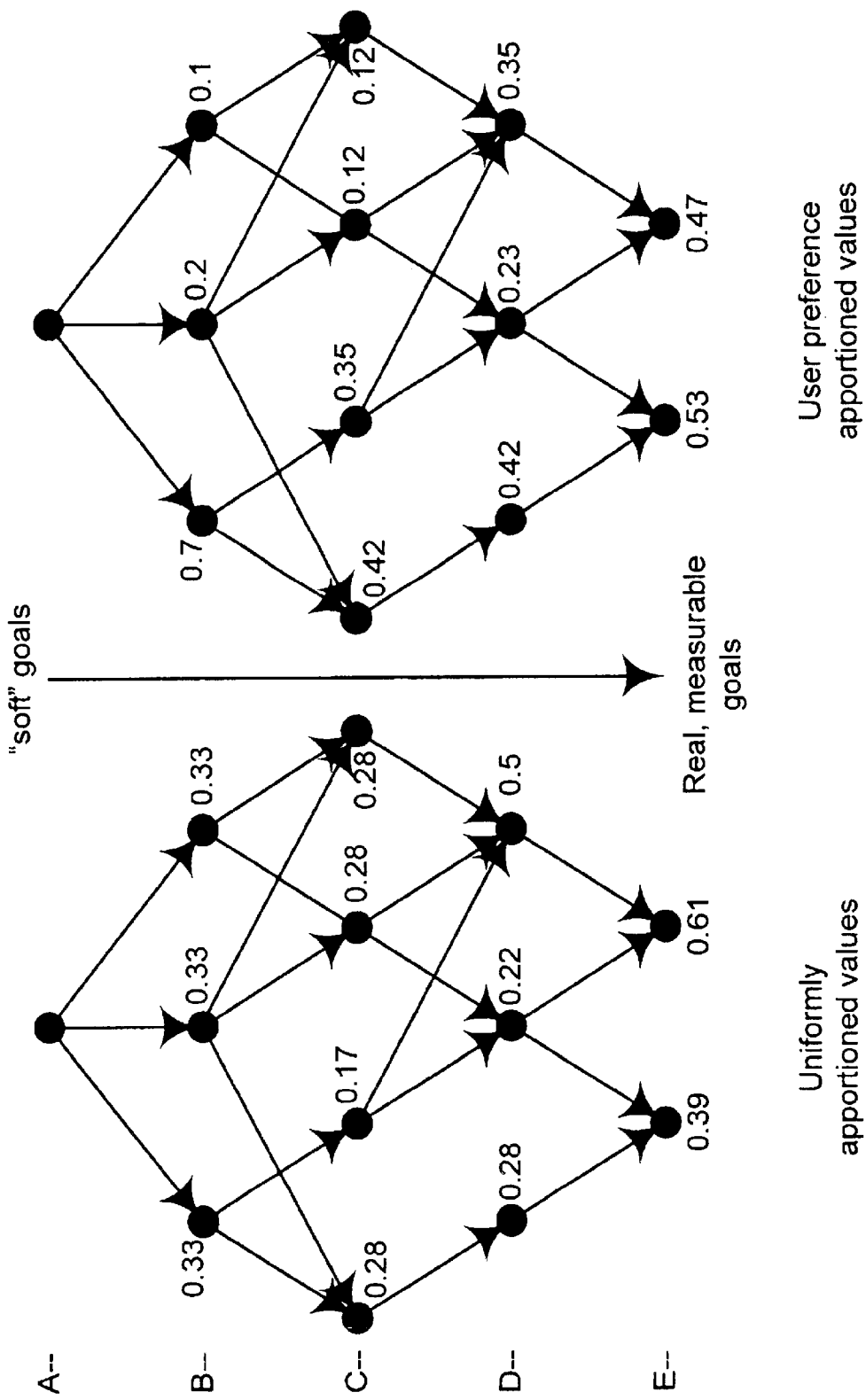
FIG. 1A — Uniformly apportioned values
FIG. 1B — User preference apportioned values

METHOD AND APPARATUS OF MEASURING A RELATIVE UTILITY FOR EACH OF SEVERAL DIFFERENT TASKS BASED ON IDENTIFIED SYSTEM GOALS

This application claims the benefit of U.S. Provisional Application No. 60/128,403, filed Apr. 8, 1999, which is hereby incorporated by reference in its entirety. This application claims the benefit of U.S. Provisional Application No. 60/128,472, filed Apr. 9, 1999, which is hereby incorporated by reference in its entirety.

BACKGROUND OF THE INVENTION

In order to manage sensors in a heterogeneous, multi-sensor environment, it is necessary to associate each information request or sensory input with a value representing the significance of that information request or sensory input. Conventionally, the amount of information collected using sensors was maximized in order to decrease the uncertainty between a mathematical model of the world and the world itself. However, while information is useful in establishing a reliable mathematical model of the world and is therefore a necessary condition for sensor management, the collection of thorough sensory information is not a sufficient condition for a comprehensive approach to sensor management. Rather, without exercising some form of a discretion with regard to information sought and/or collected, computations performed based on the collected information may produce skewed results and may be unnecessarily complex and resource consuming.

The same principles and problems apply to conventional decision-making models. Conventional decision making modes include abstract goals and discrete action tasks, but do not provide a mechanism for quantitatively relating the two. For that reason, it is difficult to determine which of several tasks has the highest relative contribution to the accomplishment of one or more system goals, and thus, which task is most critical to the satisfaction of the system goals.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIGS. 1A and 1B illustrate examples of uniformly and non-uniformly apportioned goal lattice structures in accordance with the present invention;

DESCRIPTION OF THE INVENTION

Figure 1C:
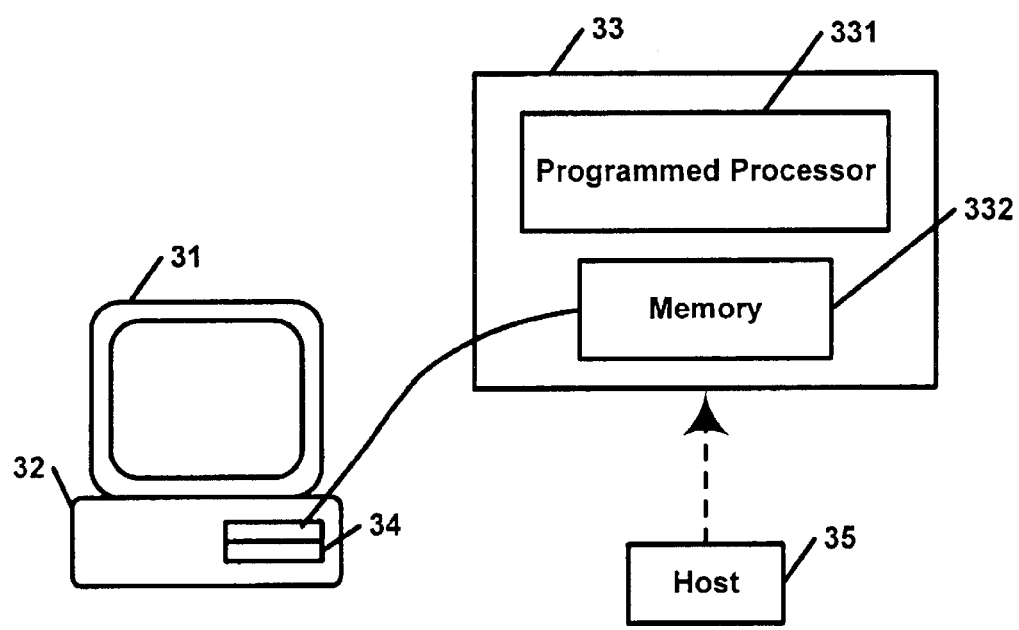
FIG. 1C illustrates an example of a computer housing a computer readable medium storing a computer program that comprises code segments capable of performing processes in accordance with the concepts of the present invention.

The present invention relates to methods and apparatus of measuring a relative utility for each of a plurality of goals which comprise a system objective. More particularly, the present invention relates to methods, systems, and apparatus for quantifying the relative contribution of specific goals to a set of broader goals, and for enabling decision making, and resource allocation, with regard to the performance of those goals based on the quantified relative contribution. In preferred embodiments, a lattice is created based on an ordering relation and relative values are apportioned to the goals using their position in the lattice as including, included, and or unrelated goals.

It is to be understood that both the descriptions are exemplary and explanatory and are intended to provide further explanation of the invention as claimed. Thus, it should be understood that the description and specific examples, while indicating preferred embodiments of the invention, are given by way of example only. Various changes and modifications that are within the spirit and scope of the invention will become apparent to those skilled in the art from this detailed description. In fact, other object, features, and characteristics of the present invention; methods, operation, and functions of the related elements of the structure; combinations of parts; and economies of manufacture will surely become apparent from the following detailed description of the preferred embodiments and accompanying drawings, all of which form a part of the specification, wherein like reference numerals designate corresponding parts in various figures.

The present invention relates to methods, systems, and apparatus for allocating resources to accomplish a system objective, comprising one or more of the following steps in any effective order:

identifying a plurality of goals for accomplishing a system objective;

defining an ordering relation on said plurality of goals;

applying said ordering relation to said plurality of goals to create a lattice;

assigning a value to each goal, e.g., with an arbitrary assignment of value to the topmost goal, such as a value of 1.0, wherein the value of each including goal can be, e.g., apportioned among its included goals and the value of each included goal is assigned by summing the value apportioned to it by its including goals; and/or allocating resources to each goal using said assigned values.

By the phrase "allocating resources" it is meant any activity, mental or physical, in which a resource is distributed. A resource can therefore be a physical action, a performance of task(s), financial expenditure(s), decision(s), staff, network time, pointing a radar or other electromagnetic energy sensor at a particular target in order to measure its position, electrical power to subcomponents on an integrated circuit, network connections of various speeds and quality of service, employees capable of performing different tasks, trucks used for delivering goods, telephone communications paths (landline, microwave, satellite), environmental sensors on a robot, computational power, such as in the form of allocating a number of gates on an integrated circuit to a particular task, either apriori or in real-time, reconfiguration in a Field Programmable Gate Array (FPGA), etc.

Resources can be allocated for the purpose of accomplishing a system objective. A system objective is generally a top-level purpose. For example, in a business, a system objective can be to achieve a dominant share in the market, develop new products, or achieve a certain level of profitability. Along these lines, the method can be useful for allocating resources, such as money and personnel, in order to achieve the goal of obtaining a dominant share in the market.

To perform the method, a plurality of goals for accomplishing the system objective can be identified. By the term "goal," it is meant any task, activity, end-result, etc., which is to be considered in order to accomplish the system objective. In the business example of achieving a dominant share in the market, goals can be, e.g., to open a new store, to purchase the land for the new store, to hire a contractor to build the store, to get the necessary building permits, to establish an internet connection to the store, to analyze the market, to hire a cleaning company, to develop new products, to conduct applied research, to conduct basic research, to produce a product for sale, to manufacture a product, to advertise a product, to create a sales force, to create a support staff, to create a scientific staff, to conduct market research, etc. All such activities can be characterized as goals and the act of selecting which goals to consider to achieve the system goal can be characterized as "identifying a plurality of goals." Goals can identified by a human operator, by automatically using AI-based algorithms, etc.

After goals are identified, in a preferred embodiment of the invention, an ordering relation is defined. The phrase "ordering relation" means any property that can be said to hold (or not to hold) for two objects in a specified order such that $x<y$, $y<x$, or x and y are unrelated (where "<" means "included in"). If $x<y$ and $y<x$, then $x=y$. Also, if $x<y$ and $y<z$, then $x<z$. The combination of an ordering relation and a set of objects (in this case, goals) yields a partially ordered set (POSET).

An ordering relation is used as a means of classifying the multiplicity of goals as (a) included goals (i.e., goals which are included in, are a a part of, or contribute to the accomplishment of high-level goals), (b) including goals (higher-level goals which encompass "included goals", and (c) unrelated goals."

An including goal is one which is comprised of included goals, i.e., included goals are "included" in an including goal. In the business example above, the goal of "developing new products" is an including goal which has the following included goals: conducting basic research, conducting applied research, creating a scientific staff, and conducting market research. Goals such as creating a sales force and manufacturing a product may be unrelated to the goal of "developing new products" and therefore can be characterized as "unrelated goals."

The order relation is used to create a lattice. By term "lattice," it is meant, a representation of the relationship among all the goals as imposed by the ordering relation, preferably having a greatest lowest bound and a least upper bound. The representation can be graphical (e.g., a Hasse diagram), a matrix, or any suitable form. A lattice can be created by any conventional or state-of-the-art method. See, e.g., James and James *Mathematics Dictionary* ["Lattice: A partially ordered set in which any two elements have a greatest lower bound (g.l.b.) and a least upper bound (l.u.b.), the g.l.b. of a and b being an element c such that $c<=$[less than or equal to, included in or equal to] a, $c<=b$, and there is no d for which $c<d<=a$ and $d<=b$, and the l.u.b. being defined analogously] and *Naïve Set Theory* by Paul R. Halmos, 1960.

Goals which are unrelated by the order relation, and are all included in one or more including goals, can be characterized as being on a "level." See, e.g., FIG. 1A, levels A, B, C, D, and E. Mathematically, these unrelated goals have a "least upper bound (lub)" as described in the definition of lattice above.

After a lattice has been created, a further step of the invention preferably comprises assigning a value to each of the goals in the lattice. The lattice and the assigned values is referred to as a "goal lattice." Values of the goal lattice can be assigned by any effective method which apportions the value of including goals among the corresponding included goal. Apportionment can be arbitrary, uniform, calculated using an algorithm or function, subjective by a human operator evaluating the relative utility of each goal, etc. For instance, with reference to FIG. 1A. a topmost goal, i.e, the system objective, can be assigned an arbitrary value of 1. This value can be apportioned uniformly among the included goals as shown in FIG. 1A, it can be apportioned to a user-preference as shown in FIG. 1B, it can be apportioned automatically by an algorithm, or function, or any other suitable means of apportioning values among goals.

In accordance with a preferred embodiment, the values are assigned such that the value of each including goal is apportioned among its included goals and the value of each included goal is assigned by summing the value apportioned to it by its including goals. Such step for uniform apportionment is illustrated in FIG. 1.

An assignment of value to a goal does not have to be static. Values can be also determined continuously, intermittently, periodically, etc,. by any mathematical function which automatically computes and updates their values based on changes in the environment.

Once values are assigned to goals in the lattice, resources can be allocated to each goal using the assigned values. Allocation can be temporal allocation where a value tells the user which goal to perform first. Allocation can also be proportional where a value tells the user how much of the resource to allocate toward a specific goal. For example, with reference to FIG. 1, where goals are mutually exclusive, values can be used to determine which goal to perform first, e.g., a higher value can mean that the goal should be performed before, or prior to, a goal with a lower value on a particular level of goals. If a goal is not mutually exclusive, the values can be used to determine how much expenditure is allocated to each, e.g., a higher value gets a higher expenditure of money.

As mentioned, methods and systems of the present invention, can be used for a variety of purposes, including, e.g., business applications, military system design and control applications, community planning research and development, employee compensation, etc., in virtually any environment in which resource allocation is to be accomplished and in which a user can apportion values among the various included goals.

For example, a method of the present invention can be used to determine which of several networks to use, such as a T1 line, a fiber-optic, and a serial line. A system objective in such a case can be to achieve customer satisfaction. Identified goals can include, e.g., rate of data input for each line, rate of data output for each line, costs of each line, speed of response, etc.

A goal lattice can be stationary or non-stationary. For instance, once an ordering relation among a plurality of goals is created, an assigning step can be performed at different times to adjust for changing user-preferences, or other measures of goal utility.

In an embodiment of the invention, the method is applied to sensor management. To perform sensor management comprehensively, values must be assigned to designate the significance of each information request or sensor output since not all information requests and sensor outputs can be satisfied in a constrained or stressing environment, and some method must be available to decide which requests to satisfy given the existence of resource limitations and environment stresses. To that end, the present invention involves a system and method for assigning values to information requests or sensory outputs, which values represent the relative contribution of those information requests or sensor outputs to the accomplishment of one or more of several system goals.

FIGS. 1A and 1B illustrate examples of uniformly and non-uniformly apportioned goal lattice structures in accordance with the present invention, demonstrating a relationship among goals that are related in accordance with an ordering relation. Specifically, as shown in FIGS. 1A and 1B, two lattice structures are shown, each having several layers of nodes (e.g., A–E), each node representing a goal. The level of abstraction for each node within the lattice structure is such that the top-most nodes represents system goals having a highest order of abstraction (e.g., conceptual, tactical goals or "soft" goals) while the bottom-most nodes represent system goals and tasks having the lowest order of abstraction (e.g., real and measurable goals or "hard" goals). In other words, since the bottom-most goals have the lowest order of abstraction, they generally represent specific tasks that may be performed to accomplish the higher order system goals. In these lattice structures, goals on the same level have the same level of abstraction.

FIG. 1C illustrates an example of a computer having a computer readable medium that stores a computer program comprising code segments capable of performing processes in accordance with the concepts of the present invention. As shown in FIG. 1C, the computer includes at least a video display device (VDD) 31 and a main unit 32 including a main processing board 33 and storage device 34. Main processing board 33 includes programmed processor 331 and computer-readable memory 332. Computer-readable memory 332 can include a random access memory (RAM), a read only memory (ROM), or any volatile or non-volatile memory device. Storage medium 34 is another computer-readable memory device which can include a fixed hard disk drive and/or a removable storage medium for a non-fixed disk drive such as a floppy disk or a digital versatile disk (DVD). A program is stored on one of the computer-readable memory devices which causes the processor 331 to implement a method according to the invention.

Alternatively, a host device 35 may be used to download a program which causes the processor 331 to implement the method according to the invention, in which case, the computer-readable medium in which the program is embodied takes the form of a propagated signal.

Figure 2:
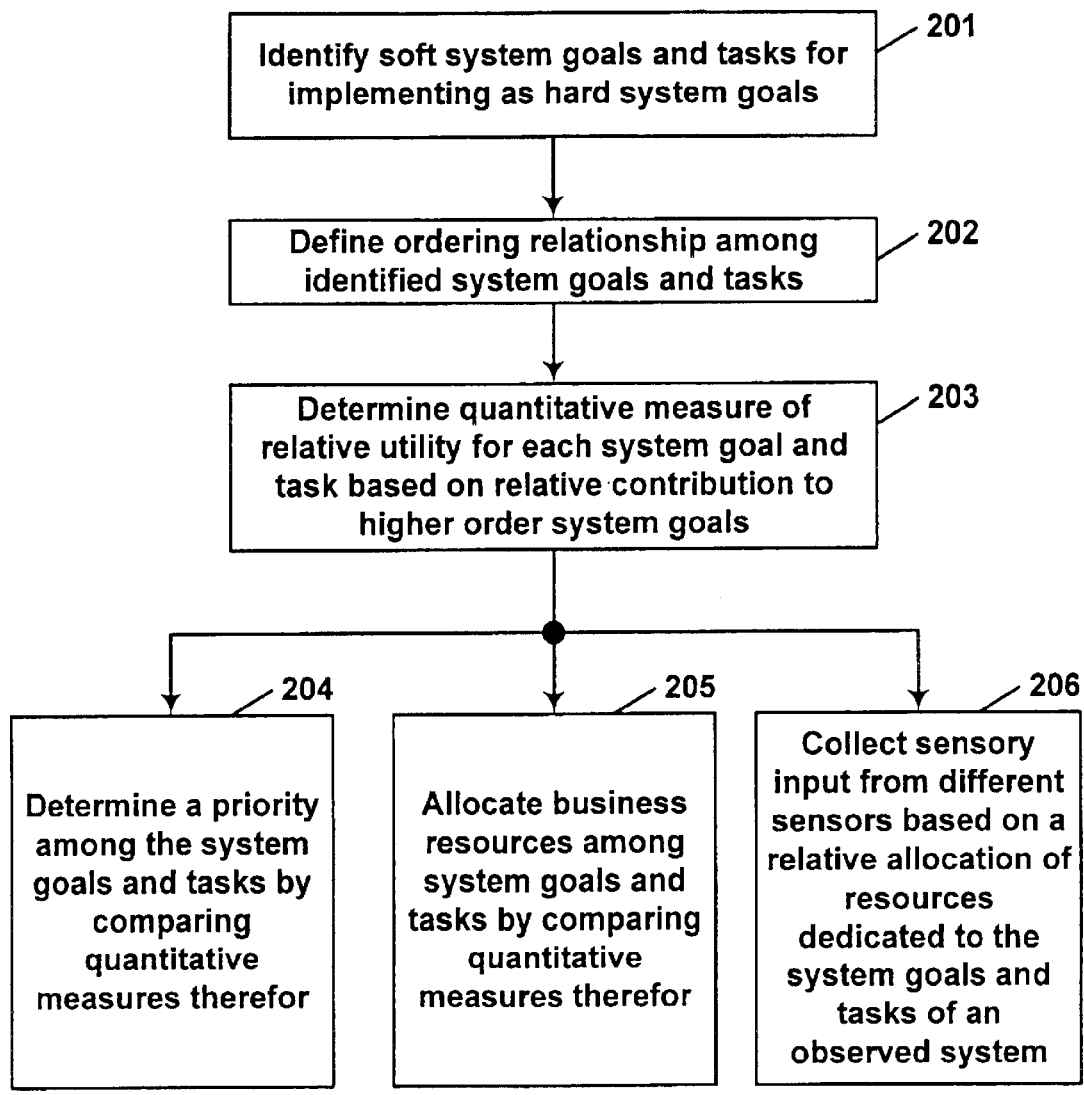
FIG. 2 illustrates an exemplary flowchart of steps performed by a method used to measure a relative utility for each of several different tasks based on system goals according to the present invention.

FIG. 2 illustrates an exemplary flowchart of steps performed by a method used to measure a relative utility for each of several different goals based on a system objective according to the present invention. As shown in step 201 of FIG. 2, the first stage in the development of the goal lattice involves an identification of the broadest conceived set of tactical and strategic goals. Then, more specific system goals are identified which are capable of accomplishing the broadest set of goals, independently or as a group.

As shown in set 202 of FIG. 2, the theory of orderings or ordering relations is applied by the present invention to relate system goals for a sensory system or decision making system and the tasks used to accomplish those systems goals. In general, this theory dictates that a partially ordered set is comprised of two components, a set of elements and an ordering relation defined on that set.

$$X=\{S, \leq\}$$

If the ordering relation relates every element to every other element, then the set and ordering relation form a totally ordered set or a chain. For example, if the set includes all integers and the ordering relation is the simple arithmetic "less than," then we have a totally ordered set because every integer is "less than" some other integer. Conversely, if the set and ordering relation do not relate all elements but each pair of elements have both a greatest lower bound (glb) and a least upper bound (lub), then the set and ordering relation form a partially ordered set (POSET), also called a lattice. For a POSET, the inclusion relationship (e.g., ) must meet the three requirements of reflexivity, asymmetry and transitivity. An example of an inclusion relation is the set:

$$S=\{A,B,C\},$$

where the ordering relation is defined as "is a subset of." Clearly $\{A, B\}$ is a subset of $\{A, B, C\}$, but $\{A,C\}$ is not a subset of $\{A,B\}$.

In step 202, the ordering relation is defined as "(this goal) is necessary to achieve (this other goal)". By applying this ordering relation to the set of goals, a lattice structure is achieved, such as that shown in FIG. 1A or that shown in FIG. 1B.

Next, in step 203, a quantitative measure of relative utility is determined for each goal based on the relative contribution of that system goal to the accomplishment of higher order system goals. This process involves two steps, goal value apportionment and goal value accrual.

Goal value apportionment is the top down process of forced distribution of a goal's value among its directly included goals. In this step, each including goal is ignorant about whether an included goal contributes to the accomplishment of other including goals. The lattices of FIGS. 1A and 1B are useful for illustrating the relationship among subservient (included) and dominating (including) goals. Although these lattices lack quantitative information about individual goals, they show an ordering relationship between what might be called "soft" goals near the top and "hard" goals near the bottom, where "soft" goals generally refer to conceptual and strategic objectives, and "hard" goals generally refer to finite and measurable actions or more narrowly construed objectives useful for accomplishing one or more of the soft goals.

If the ordering relation indicates that each included goal contributes to each including goal, then it is straightforward to impose on the lattice a zero-sum (or in this case, a 1-sum) distribution of goal values from an including goal to its included goals. That is, if we assume a value of one (1) for the topmost goal, then each included goal which directly contributes to the accomplishment of that topmost goal contributes something to that value, and hence the value is distributed among the lower order goals. This is readily apparent from the simple goal lattice shown in the left half of FIG. 1A. In this lattice, the value of each goal is uniformly distributed among the included goals, a distribution that follows from an assumption that each directly included goal contributes equally to the including goal.

For example, the topmost goal of FIG. 1A has three (3) included goals. Assuming the topmost goal has a value of one (1), the sum of the values of its included goals will be equal to the value of the top most goal, namely, one (1). If each of the three included goals makes an equal contribution to the topmost included goals on equal value based on its relative contribution, each of the three (3) included goals would have a contribution of 0.33 to that value. Similarly, of the three (3) goals that are subservient and thus included in the topmost goal, the left most goal is a dominant and including goal having two (2) subservient or included goals. Thus, the value of the left most goal is distributed among each of the two included goals, resulting in a distribution of one half (½) its value (e.g., 0.5×0.33=0.167) to each assuming equal contributions therefrom.

Uniform apportionment of values among included goals, as shown in FIG. 1A, is the exception rather than the norm. It is more likely that some included goals are more necessary to accomplish the including goal than others, resulting in higher relative value apportionment for those included goals. An example of this is shown in the goal lattice of the FIG. 1B, in which the values of including goals are not equally distributed among the included goals.

In addition, the values of some included goals receive contributions from more than one including goal. For instance, among the goals on level C of the lattice structure shown by FIG. 1A, the value of the left most goal receives contributions from the left most and central goal of level B. Therefore, assuming equal apportionment of values from the including levels to included levels, the value of 0.28 represents a contribution of 0.167 from the left most goal and 0.11 from the central goal of level B. The process of associating values from plural including goals to a single included goal is the second part of step 203, generally referred to as goal value accrual, which will be described hereinafter.

Generally, a goal contributes to the accomplishment of more than one including goal and as such, should receive value based on its contribution to each of those including goals, even if it is only included in a single including goal. Once the goal values are apportioned among included goals, it is simple to perform goal value accrual by summing the contribution each goal makes to the goals which are included in it. Through this process, each included goal in the lattice acquires its value which is then apportioned among its included goals. FIGS. 1A and 1B show value accrual as well as value apportionment.

The process of generating a goal lattice can therefore comprise steps of identifying all relevant goals; ordering the goals in a lattice, and for each layer in the lattice, apportioning each goal's value among directly included goals and accruing values at each included goal.

Computationally this is a remarkably simple procedure once the off-line task of identifying goals and ordering them has been accomplished. The simplicity of the computation allows for real-time updating of the goal lattice, and hence the values of particular action items, thus changing their relative importance in direct relationship to their contribution to the accomplishment of the goals.

After steps 201–203 of FIG. 2 are performed, any or all of steps 204–206 may be performed. In step 204, a priority is determined among the system goals and tasks by comparing the quantitative measures determined therefor in step 203. For instance, evaluating the lattice structure shown in FIG. 1A, the task associated with the node having a value of 0.61 may be given a higher (or lower) priority than the task associated with the node having a value of 0.39.

In step 205, business resources are allocated among different system goals and tasks by comparing the quantitative measures determined therefore in step 203. For instance, again referring to the lattice structure shown in FIG. 1A, more (or less) business resources may be allocated to the task associated with the node having a value of 0.61 than to the task associated with the node having a value of 0.39.

In step 206, sensory input is collected from different sensors based on a relative allocation of resources dedicated to the system goals and tasks of an observed system. By doing so, an observed system may be modeled in terms of identifiable system goals and tasks, and the allocation of resources to those system goals and tasks may be used to determine the sensory input to be collected, or to determine characteristics or other strategic data concerning the observed system.

Figure 3:
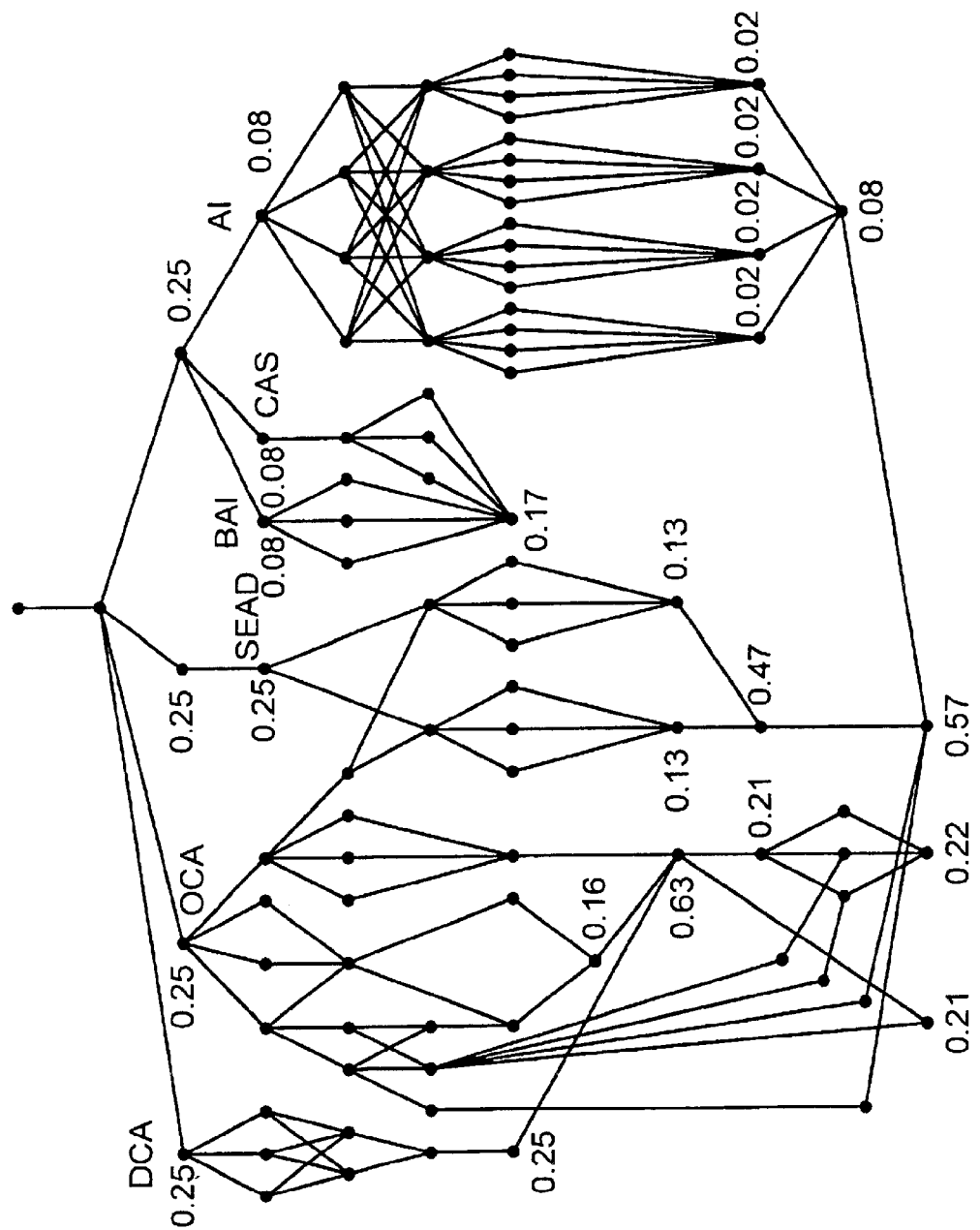
FIG. 3 illustrates and example of a particular goal lattice structure used to describe one implementation of the present invention.

FIG. 3 illustrates an example of a particular goal lattice structure used to describe one implementation of the present invention. The following provides a detailed example of the present invention applied to generate the goal lattice of FIG. 3. Joint Chief of Staff Publications (JCS Pub 1 and Pub 3) and Air Force doctrinal manuals (AFM 1-1, *Basic Aerospace Doctrine of the United States Air Force* and AFM 1-10, *Combat Support Doctrine*) were studied in order to establish a set of goals from which a goal lattice could be developed in order to assess the suitability of goal lattices for determining the value of particular actions. These publications and manuals outline six separate mission areas which include Offensive Counterair (OCA), Defensive Counterair (DCA), Air Interdiction (AI), Battlefield Air Interdiction (BAI), Close Air Support (CAS), and Suppression of Enemy Air Defenses (SEAD). Specific goals within each mission area are further described in USAF's Air Command and Staff College Course material.

From these documents, a set of ninety (90) goals was developed, including, for example, To compel the adversary to due our will (topmost goal)
To achieve control of the air
To deny enemy freedom to carry out offensive operations
To minimize weapons expenditure
To navigate
To assess the state of enemy readiness
To search for enemy targets
To ID targets.

None of these goals are directly quantifiable, hence they are "soft" goals. To "achieve control of the air" is a useful goal, but it cannot be interpreted in terms of any single physical sensor action. It can, however, be achieved by those hard goals or tasks which support it or, in lattice terminology, are "included" in it. For instance, included goals like "to search for enemy targets" are hard goals or tasks since the represent physical actions which can be performed and controlled by selecting a particular sensor to perform that action. What is therefore demonstrated by the development of this goal lattice is that some goals are soft and amorphous and others are real physical actions. Both are needed to construct the goal lattice because the raison d'etre for the goal lattice is to show a rigorous path from the amorphous goals to the value of performing individual, real physical actions which are capable of being controlled.

Values were then superimposed on this lattice in accordance with one of the author's assessment of the relative contribution of each included goal to each including goal as is outlined in the procedure above. The resulting goal lattice is shown in FIG. 3. In this example it is assumed that all included goals contribute equally to each including goal, but this is not necessarily or usually the case. Here it is assumed that the topmost four goals of "to deny enemy freedom to carry out offensive operations," "to obtain and maintain air superiority," "to allow friendly forces to perform their mission," and, "to control tempo of battle operations," are of equal value and hence each is assigned a value of 0.25. Clearly, for some scenarios, it may be more important "to allow friendly forces to perform their mission" than "to deny enemy freedom to carry out offensive operations," and this can be reflected by a real-time change in the relative weights of these topmost 4 goals.

The goal lattice technique has also been applied with equal success to a civilian example in the form of the National Aeronautics and Space Administration (NASA) mission. NASA's Strategic Plan of May 1994 identifies three major mission areas, scientific research, space exploration, and technology development and transfer. NASA lists them in more detail in a later document as:

1. To explore, use and enable the development of space for human enterprise.
2. Advance and communicate scientific knowledge and understanding of the Earth, the solar system, and the universe, and use the environment of space for research.
3. Research, develop, verify, and transfer advanced aeronautics, space, and related technologies.

There are two ways in which to interpret the values associated with each of the action items at the bottom of the goal lattice depending on whether resources which are available to carry them out are continuous or discrete (mutually exclusive). If the resources are continuous, such as in the case of funding sources which are being used to satisfy the goals of an organization or a large number of aircraft are available to search an area, then the values can be used to apportion this continuous resource among the various actions. If the resources are discrete, as in the case of a sensor which can either search, track, or identify a target, then the value can be used to make the decision as to which type of action to take at that time. As the goal lattice values change over time, then the values of the action items will change and resources will be used in a different manner to best achieve the goals.

The values of action items depend on the structure of the goal lattice as well as the individual value apportionment's. In some cases, as is somewhat apparent in the USAF example, the structure can be skewed resulting in significantly more value being accrued by some of the specific actions than others. Also, the apparent structure of the lattice changes in real time as the operator changes the values of the topmost goals as the mission progresses. For example, if there is no need for offensive counter air, then the value of this goal is zeroed, or made very small, and its value redistributed among the remaining goals on the same level.

The goal lattice can easily be represented in a linear algebraic form leading to an interpretation of the goal lattice as being a set of linear transformations of goal values from one level of the $$C_i = \Gamma_i C_{i+1}$$

lattice to another. In matrix form, the goal lattice becomes:

$$C_i = [C_{i,1} C_{i,2} K C_{i,R_i}]^T$$

where a vector $R_i$ node values for level i is the transition from level i to level i+1 is $$\Gamma_i = \begin{bmatrix} g_{i,1,1} & g_{i,2,1} & K & g_{i,R_i,1} \\ g_{i,1,2} & g_{i,2,2} & K & g_{i,R_i,2} \\ M & M & M & M \\ g_{i,1,R_{i+1}} & g_{i,2,R_{i+1}} & K & g_{i,R_i,R_{i+1}} \end{bmatrix}$$

with the subscripts of meaning: from level i, node number within level i, node number within the next level. Finally, the $$C_{i+1} = [C_{i+1,1} C_{i+1,2} K C_{i+1,R_{i-1}}]^T$$

vector of $R_{i+1}$ nodes for level i+1, The sums of the columnns of $C_i$ is the sum of the arcs leaving a node at level i and must sum to 1.

A benefit of the goal lattice approach is that it allows one to quantify and make measurable amorphous, non-measurable, "soft" goals. It not only allows for the straightforward apportionment of goal values from soft goals to specific action items, but forces the system designer to formally describe the goals of the system, as well as to quantify the interrelationship among system goals. Rather than defining the system in terms of how it behaves against specific environmental scenarios, or engineering performance measures which are indirect measures of the accomplishment of system goals, the system can now be designed in terms of goal accomplishment.

Goal lattices allow for prior planning and goal value determination before a mission begins while still allowing the operator to modify the relative values of particular goals in real time. This approach of goal management rather than sensor management indirectly controls the behavior of the system rather than directly controlling the actions of specific sensors or systems. Since this is a goal directed system, if the goals have been enumerated correctly and their interrelationship properly specified, no system can perform better, because goal achievement is the performance measure.

Goal lattices should be viewed in the context of other performance measures which have been used to the optimization of sensor management systems. System management can be defined as ". . . the process which seeks to manage or coordinate the use of sensing resources in a manner that improves the process of data fusion and ultimate perception, synergistically." Sensor management can be contrasted with sensor scheduling, which refers to the actual allocation of measurement tasks to specific sensors. The concepts of this invention can be applied to achieve a mathematically rigorous, yet tractable and implementable approach to real-time sensor management that lends itself to piece wise optimization and evolutionary improvement. Typical conventional performance measures are chosen based solely on the ability of a well-known optimization method to optimize the achievement of mission goals. One reason the goal lattice is superior to these conventional systems is because it directly, rather than indirectly, implements strategic and tactical goals to generate a measure that can be used by the system for optimization.

When applied to sensor management and scheduling, this invention is directly and immediately applicable to several aspects of hyperspectral sensor imaging, which applications range from system analysis to system design, as well as real-time implementation of a goal-driven, almost-optimal sensor management system.

Specifically, as described above, at the system level, goal lattices require the formulation of a set of goals which the system is to accomplish. Through a straightforward procedure, an ordering relationship is used to generate a lattice which represents the partially ordered set (POSET) of goals. Superimposed on this lattice is a subjective evaluation by the system designers of the relative contribution of each included goal to the accomplishment of a higher goal. Since each lower goal contributes to several higher goals, each lower goal's value is the summation of its contributions to higher goals. The lowest goals in this lattice may be real and measurable actions. For instance, the lowest goals may represent sensor tasks associated with particular sensors, not necessarily homogeneous or on the same platform. The net result is that goal lattices can be used to determine how much each sensor task contributes to the accomplishment of system goals, thereby allowing a natural way of distributing funding among the development of various sensor components and a determination of the cost/benefit of new technologies directly in terms of R&D costs and goal accomplishment.

Tradeoff studies can also be done with this approach based on changing the relative values of different included goals as they support the overall system goal. As an example of this approach, a goal lattice has been developed based on the Air Force mission (included in the PowerPoint® slides which are attached to this document). The concepts of this invention are also useful for partitioning an entire sensor management system into major components whose tasks are clearly identified and interface specified. An automatic control system model may be developed which can be used to analyze bandwidth and stability, two parameters which determine how a system responds to a stressing environment.

Concentrating use of goal lattices within the context of a real-time sensor management system results in still other advantages. The use of goal lattice values to determine the relative values of specific sensor actions in terms of how they contribute to goals allows for a partitioning and subsequent independent optimization of the sensor scheduling task from the sensor management task. That is, direct control is done through an automatic control loop which deals with the relative value or importance of goals and information collection to support those goals with indirect control being given to the human operator through the ability to modify the values associated with individual goals in real time.

The concept of Goal Lattices is a concept which allows the sponsors to have significant indirect effect on the allocation of R&D resources since it allows managers of a system (e.g., responsible Air Force Offices) to either prepare the system goal lattice and assign relative values to the included goals or to evaluate the goal lattice prepared by the contractor and alter the relative values or add additional goals. The relative values of specific actions or funding of particular programs are then calculated dispassionately by the goal lattice based on the ability of that R&D effort to contribute to mission goals.

If a new R&D program is proposed, it can quickly be evaluated relative to other existing programs by determining how it contributes to the lattice of system goals. With this approach, some of the goal accomplishment that had been apportioned to other programs must be diverted to this new program. The new program may acquire a small amount of this goal value or a lot, depending on how well it contributes to the accomplishment of the goals relative to the other programs. The new values assigned to existing programs and the newly proposed programs can be used to either make linear funding decisions in terms of a continuous medium such as dollars, or used as a binary decision to decide which programs to support or cancel based on their relative worth in terms of their support of system goats.

Although the concept of goal lattices is presented within the context of a sensor management system, it is equally applicable to any system in which there are multiple competing goals and multiple competing means of accomplishing those goals. For example, it is also possible for one to use the technique to attempt to model the goal lattice of an opponent by measuring his actions and inferring the values which he has placed on his intermediate goals. The better assessment there is of an opponent's goals, the better one can deploy one's own resources to counter the threat.

While there have been illustrated and described here what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

We claim:

1. A computer-implemented method for allocating resources to accomplish a system objective comprising:
   a) identifying a plurality of goals for accomplishing a system objective,
   b) defining an ordering relation on said plurality of goals, whereby including goals, included goals, and unrelated goals are defined;
   c) applying said ordering relation to said plurality of goals to create a lattice,
   d) assigning a value to each goal, wherein the value of each including goal is apportioned among its included goals and the value of each included goal is assigned by summing the values apportioned to it by its including goals; and
   e) allocating resources to each goal using said assigned values.

2. A method of claim 1, wherein said assigned values are uniformly apportioned.

3. A method of claim 1, where said assigned values are user-preference apportioned.

4. A method of claim 1, wherein the assigning a value to each goal comprises, defining the relative contribution of an included goal to the accomplishment of an including goal.

5. A method of claim 1, wherein the assigning of a value to each goal comprises:
   assuming a relative utility value for each of the including goals that are defined by the ordering relation to be on a layer of the lattice having a highest level of abstraction; and
   apportioning the relative utility values of each including goal among included goals that are defined by the ordering relation to be on a layer of the lattice having a lower level of abstraction,
   where the relative utility values are apportioned according to the relative contribution of each included goal or task to the accomplishment of an including goal, and
   wherein the values apportioned to each included goal define the relative utility values of the subservient system goals or tasks, the sum of the relative utility values that are apportioned from an including goal being equal the numerical value of that included goal.

6. The method of claim 5, wherein the assigning of a relative utility value to each goal comprises:
   summing all relative utility values apportioned to a goal to achieve the relative utility value for that goal.

7. The method of claim 6, further comprising:
   determining a priority among goals by comparing the relative utility values assigned thereto.

8. The method of claim 5, further comprising:
   allocating business resources among the goals based on the relative utility values assigned to the tasks in order to improve the effectiveness of the business resources in accomplishing the system goals.

9. The method of claim 5, further comprising:
   collecting sensory input from different sensors based on the relative utility values assigned to the tasks.

10. A computer readable medium storing a computer program that measures a relative utility for a plurality of goals, the computer program comprising:

a first code segment that receives input comprising a plurality of goals for implementing a system objective;

a second code segment that defines an ordering relation among the inputted goals, whereby including goals, included goals, and unrelated goals are defined;

a third code segment that applies said ordering relation to create a goal lattice; and a fourth code segment for assigning a value to each goal, wherein the value of each including goal is apportioned among its included goals and the value of each included goal is assigned by summing the value apportioned to it by its including goals.

11. The computer readable medium of claim 10, wherein the second code segment includes a code segment defining the ordering relationship as a graphical representation of the lattice in which the goals are arranged on several layers, each layer of goals having a different level of abstraction relative to performing the system objective.

12. The computer readable medium of claim 10, wherein the fourth code segment that assigns a value to each goal comprises:

a code segment that assumes a relative utility value for each of the including goals that are defined by the ordering relation to be on a layer of the lattice having a highest level of abstraction; and a code segment that apportions the relative utility values of each including goal among included goals that are defined by the ordering relation to be on a layer of the lattice having a lower level of abstraction, where the relative utility values are apportioned according to the relative contribution of each included goal or task to the accomplishment of an including goal, and wherein the values apportioned to each included goal define the relative utility values of the subservient system goals or tasks, the sum of the relative utility values that are apportioned from an including goal being equal the numerical value of that included goal.

13. The computer readable medium of claim 12, wherein the code segment that assigns relative utility values to goals comprises:

a code segment that sums all relative utility values apportioned to each particular goal to achieve the relative utility value for that goal.

14. The computer readable medium of claim 10, further comprising:

a fifth code segment that determines a priority among tasks by comparing the relative utility values assigned thereto.

15. The computer readable medium of claim 10, further comprising:

a fifth code segment that allocates business resources among the tasks based on the relative utility values assigned to the goals in order to improve the effectiveness of the business resources in accomplishing the system objective.

16. The computer readable medium of claim 10, further comprising:

a fifth code segment that collects sensory input from different sensors based on the relative utility values assigned to the goals.

* * * * *